Figure 1:
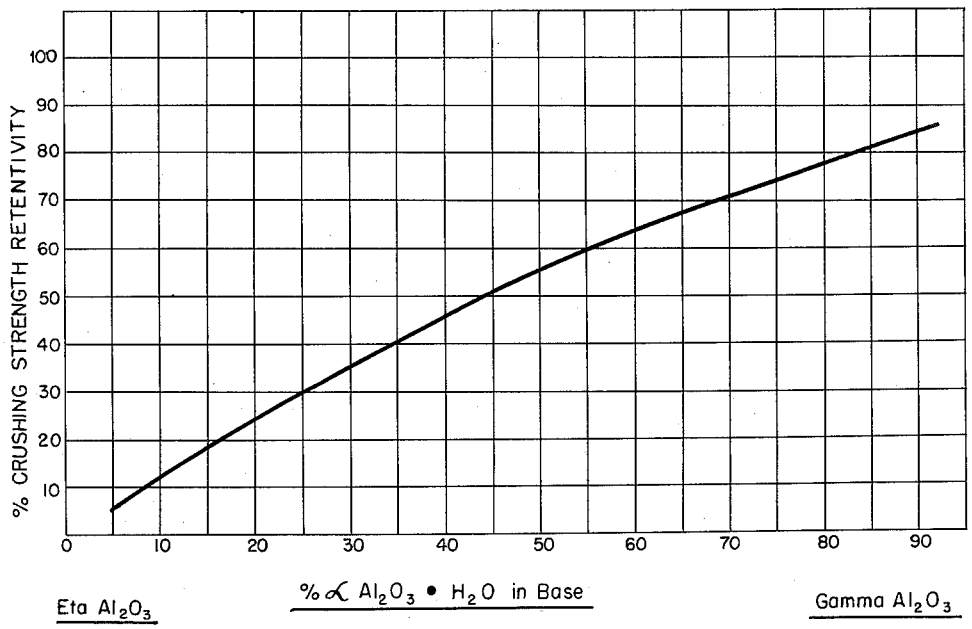

March 13, 1962 S. M. OLECK ET AL 3,025,248
MANUFACTURE OF PLATINUM-ALUMINA CATALYST
Filed July 30, 1959

Inventors
Stephen M. Oleck
Edward J. Rosinski
Stephen J. Wantuck
By Raymond W. Barclay
Attorney

United States Patent Office 3,025,248
Patented Mar. 13, 1962

3,025,248
MANUFACTURE OF PLATINUM-ALUMINA CATALYST
Stephen M. Oleck, Moorestown, Edward J. Rosinski, Almonesson, and Stephen J. Wantuck, West Collingswood, N.J., assignors to Socony Mobil Oil Company, Inc., a corporation of New York
Filed July 30, 1959, Ser. No. 830,603
5 Claims. (Cl. 252—466)

This invention relates to the manufacture of a platinum-alumina catalyst. More particularly, the present invention is directed to the manufacture of a catalytic composite characterized by unusual physical strength and strength retention consisting essentially of a major proportion of alumina made up of a mixture of eta and gamma alumina and a minor proportion of platinum.

Alumina and alumina hydrates, as is well known, may be present in various transitional forms or phases either as a single phase or as a mixture of two or more phases. Thus, alpha-alumina is a high temperature phase occurring naturally in rocks as the mineral corundum. Beta alumina monohydrate or diaspore also occurs abundantly in nature. Alpha alumina monohydrate may be prepared synthetically in various ways, for example, by addition of ammonium hydroxide to an aluminum chloride solution. Alpha alumina trihydrate may be prepared by aging alpha alumina monohydrate in a cold basic solution. Beta alumina trihydrate is also formed by aging alpha alumina monohydrate in a cold basic solution but is unstable and gradually is tranformed into alpha alumina trihydrate. Chi alumina is obtained upon calcination of alpha alumina trihydrate. Gamma alumina is obtained upon calcination of alpha alumina monohydrate. Eta alumina results from calcination of beta alumina trihydrate. The nomenclature as used herein with reference to alumina phase designation is that generally employed in the U.S. and described in "The Aluminum Industry: Aluminum and Its Production" by Edwards, Frary, and Jefferies published by McGraw-Hill (1930). The various above-designated phases of alumina including occurrence in nature, preparation, phase transitions, crystal structure and physical properties are described in detail in "Alumina Properties" by A. S. Russell et al.; Aluminum Company of America; Pittsburgh, Pa. (1956).

It has heretofore been known that the phase status of alumina employed in a hydrocarbon conversion operation, either as a catalyst component or catalyst support, has a direct bearing on the catalytic characteristics of the alumina so employed with a resulting substantial influence on the extent and nature of the desired catalytic reaction. Thus, it has been recognized that a mixture of eta and gamma alumina is a preferred composition for use as a catalyst base upon which may be deposited one or more metals or metal compounds appropriate to the catalytic result desired. Gamma alumina is known to result from calcination of alpha alumina monohydrate

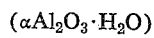
$$(\alpha Al_2O_3 \cdot H_2O)$$

Eta alumina, on the other hand, is obtained from calcination of beta alumina trihydrate ($\beta Al_2O_3 \cdot 3H_2O$). Accordingly, alumina in the hydrous state preferably consists, for the above-noted purposes, of a mixture of alpha alumina monohydrate and beta alumina trihydrate. It has further previously been established that for certain hydrocarbon conversion reactions carried out in the presence of hydrogen such as reforming, hydrocracking, hydrodesulfurization, isomerization, and the like, a particularly effective alumina base upon which may be deposited catalytically active metals or metal compounds is one obtained from a hydrous alumina base containing alumina trihydrate admixed with an amount generally in the range of 5 to 50 percent by weight of alpha alumina monohydrate. Particularly preferred have been hydrous alumina composites having an alpha alumina monohydrate content in the approximate range of 10 to 35 percent by weight and a beta alumina trihydrate content in the approximate range of 65 to 90 percent by weight of total alumina hydrate.

Catalysts prepared using the more active alumina, i.e. eta alumina resulting from calcination of beta alumina trihydrate, have had the disadvantage of being structurally weak and of losing their strength rapidly upon use in catalytic conversion operations. Catalysts prepared with a high gamma alumina content, resulting from calcination of alpha alumina monohydrate, on the other hand, are physically strong but are less active catalytically than those prepared with eta alumina. It is thus apparent that it would be desirable to provide a catalyst having the high activity associated with an alumina composite high in eta alumina while possessing the physical strength characterizing an alumina composite having a high gamma alumina content.

It is accordingly a major object of this invention to provide an improved process for manufacturing a platinum-alumina catalyst characterized by superior physical strength and strength retention in which the alumina component is derived from hydrous alumina having a phase composition of between about 5 and about 50 percent by weight, and particularly about 10 to about 35 percent by weight of the total alumina hydrate of alpha alumina monohydrate and in which the remainder of the alumina hydrate composition is alumina trihydrate and principally beta alumina trihydrate. It is a further object of this invention to provide a process for obtaining the aforementioned physically strong platinum-alumina catalyst characterized by enhanced stability. A still further object of the invention is the provision of a process for producing a platinum-alumina reforming catalyst of high activity and high physical strength which is capable of retaining such strength upon use in a commercial reforming operation.

The above and other objects which will be apparent to those skilled in the art are achieved in accordance with the process of the present invention wherein a platinum-alumina catalyst is prepared by initially forming hydrous alumina having a phase composition of about 5 to about 50 percent of alpha alumina monohydrate and about 50 to about 95 percent by weight of alumina trihydrade predominately in the form of beta alumina trihydrate, admixing with such hydrous alumina a platinum compound present in a concentration sufficient to afford a platinum content of between about .01 and about 5 percent by weight of the ultimate catalyst and a minor proportion, not exceeding about 5 percent by weight, of nitric acid based on the weight of alumina, drying and calcining the resulting mixture at an elevated temperature sufficient to convert the alpha alumina monohydrate component thereof to gamma alumina and the beta alumina trihydrate component thereof to eta alumina. The product resulting from such mixture after drying and calcining was found to possess unusual physical characteristics and particularly to be characterized by superior strength and strength retention and high stability.

As noted hereinabove, the degree of physical strength retention of the alumina depends to a marked extent on the particular phase of alumina. Thus, gamma alumina is characterized by a high physical strength and strength retention whereas eta alumina is characterized by low physical strength and strength retention. The degree of physical strength retention of a platinum-alumina catalyst of 0.35–0.6 weight percent platinum content after a 5 hour steam treatment at 1300° F. for various composites prepared from bases containing various amounts of eta and gamma alumina components is shown in FIGURE 1 of the accompanying drawing in which crushing strength retentivity is plotted against content of alpha alumina monohydrate. Crushing strength measurements for strength retention of the catalysts is the measure of average pounds force necessary to crush individually 40 catalyst particles of 1/16" diameter and 1/8" length. This is accomplished by using a second class lever to exert the force of a rolling weight on each particle. It will be seen from such figure that there is a marked tendency for improved strength retention of the gamma alumina base as compared with the eta alumina base.

In one embodiment of this invention, alumina having the particularly desired combination of eta and gamma alumina and derived from hydrous alumina containing between about 5 and about 50 percent by weight of alpha alumina monohydrate and between about 50 and about 95 percent by weight of alumina trihydrate is improved as regards the strength and strength retention thereof by compositing with the alumina of such designated phase composition, a platinum compound and thereafter drying, mixing the resulting dried material with an aqueous solution of nitric acid containing not in excess of 5 percent by weight of $HNO_3$ based on the content of alumina. Generally, the concentration of nitric acid based on alumina will be within the approximate range of 1 to 5 percent. The nitric acid addition unexpectedly causes the alumina particles to bind into harder pellets upon extrusion. Catalysts having good activity and strength retention are thus obtained. The advantage of nitric acid addition is greatest with alumina bases containing a low proportion of the alpha alumina monohydrate phase and a high proportion of the beta alumina trihydrate phase. Such bases yield mostly eta alumina on calcination. The particular concentration of nitric acid employed will, as a matter of fact, be dependent upon the content of alpha alumina monohydrate contained in the hydrous alumina base. Thus, it has been found that nitric acid addition to a catalyst prepared from an alumina base containing about 45 percent alpha alumina monohydrate should be limited to less than about 3 percent by weight of the alumina since amounts in excess of this quantity of acid adversely affected the reforming activity of the resulting catalyst. Somewhat higher concentrations of nitric acid may be tolerated with lower contents of alpha alumina monohydrate in the hydrous alumina base employed. Thus, it has been established that with a hydrous alumina base containing about 16 percent by weight of alpha alumina monohydrate the concentration of nitric acid should necessarily be less than about 5 percent by weight based on the alumina since concentrations in excess of this amount adversely affected the catalytic reforming activity of the resulting catalyst. It is accordingly contemplated in the process of this invention that the concentration of nitric acid employed based on the weight of alumina will be a small amount less than about 5 percent by weight which does not adversely affect the reforming activity of the resulting catalyst. The particular optimum concentration of nitric acid employed in any one case will depend on the alumina phase composition and will decrease generally within the range of from about 5 to about 1 percent by weight as the content of alpha alumina monohydrate increases from 5 to 50 percent by weight in the hydrous alumina base.

Alumina having the above indicated preferred phase composition of 5 to 50 percent by weight of alpha alumina monohydrate and 50 to 95 percent beta alumina trihydrate may be prepared in any suitable manner. However, it is particularly preferred that such hydrous alumina be prepared by reaction of aluminum metal with water in the presence of a minor amount of mercury or a mercury compound. The particular phase composition of the resulting hydrous alumina product will depend upon the temperature and pH conditions maintained during the reaction period in which aluminum metal undergoes conversion to hydrous alumina. A low reaction temperature and high reaction pH favor the base formation yielding mostly the eta alumina component. High reaction temperature and low pH, on the other hand, yield gamma alumina component.

Hydrous alumina having the desired phase composition of about 5 to about 50 weight percent of alpha alumina monohydrate and about 50 to about 95 percent by weight of alumina trihydrate predominately in the form of beta alumina trihydrate is desirably produced by the reaction of substantially pure aluminum metal having a surface area greater than about 1000 square inches per pound with water in the presence of mercury or a mercury compound at a temperature within the range of 80° F. to 150° F. and a pH between about 7 and about 10 for a period of between about 8 and about 96 hours to convert substantially all of the aluminum metal into hydrous alumina.

The aluminum metal used for the production of hydrous alumina is necessarily one of high purity, i.e. generally having a purity of at least 99.9 percent. Since the process is capable of affording a slurry of practically pure hydrous alumina consisting essentially on a total hydrous basis of about 5 to about 50 percent by weight of alpha alumina monohydrate and about 50 to about 95 percent by weight of alumina trihydrate predominately in the form of beta trihydrate, it is preferred to react aluminum metal having a purity of at least 99.99 percent with substantially pure water such as distilled water to produce a resulting aqueous slurry of high purity hydrous alumina.

The physical form of the aluminum metal determines to a marked degree the rate of reaction between the aluminum and water. Other conditions remaining constant, the higher the surface area of the aluminum exposed to the water, the faster is the rate of reaction. Accordingly, it is generally preferable to use aluminum having a large exposed surface area particularly in the form of pieces having at least one dimension of substantially not more than 0.008". Aluminum in sheet or ribbon form as well as granulated, pelleted or spherical aluminum is also suitable. However, it is generally preferred to use aluminum having a surface area in excess of 1000 square inches per pound and usually between about 1000 and 4000 square inches per pound.

Mercury or a mercury compound is desirably present during the reaction of aluminum and water to accelerate the reaction forming the desired hydrous alumina. It would appear that amalgamated aluminum is formed upon contact of the aluminum with mercury or a mercury compound. The latter, upon reaction with aluminum, undergoes reduction to metallic mercury. Thus, mercuric chloride undergoes reaction with the aluminum to form metallic mercury and aluminum chloride. In similar fashion, mercuric oxide reacts with the aluminum to produce alumina and metallic mercury. When a mixture of mercuric oxide and mercuric chloride is used, the resulting products are alumina, aluminum chloride and metallic mercury. Hydrogen is produced as a by-product of the reaction between aluminum and water.

The mercury compound or mercury is generally present in catalytic amounts, generally, corresponding to an amount of mercury of between about $.25 \times 10^{-6}$ and about $100 \times 10^{-6}$ pounds of mercury per square inch of surface of the aluminum metal. Particularly, it is preferred to employ an amount of mercury or mercury compound with respect to the quantity of hydrous alumina produced such that all of the mercury introduced is physically contained by occlusion, adsorption or other means in the resultant alumina slurry. The use of such amounts of mercury or mercury compound corresponding to an amount of mercury between about $.25 \times 10^{-6}$ and about $10 \times 10^{-6}$ pounds of mercury per square inch of surface of aluminum metal have been found to be particularly desirable since the necessity of physically settling out mercury from the hydrous alumina product formed such as is essential with the use of much larger quantities of mercury or mercury compound is thereby eliminated.

In addition to metallic mercury, the mercury compound employed is selected from the following group and may be a mixture of two or more of these compounds: mercuric acetate, mercuric bromide, mercuric chloride, mercuric iodide, mercuric fluoride, mercuric nitrate, mercuric oxide, mercuric benzoate, mercuric oxalate, mercurous carbonate, mercuric chlorate, mercurous acetate, mercuric bromate, mercuric bromate, mercurous bromide, mercurous fluoride, mercurous oxide, mercurous sulfate, mercuric sulfate, mercurous nitrate and the like. The above list is not considered exhaustive since it is further contemplated that basic mercuric salts, complexes of mercury compounds, and other inorganic or organic mercury compounds may also be used. Preference, however, is accorded mercuric chloride and particularly dilute aqueous solutions thereof containing an amount of mercuric chloride corresponding to between about $0.6 \times 10^{-6}$ and about $5 \times 10^{-6}$ pounds of mercuric chloride per square inch of surface of the aluminum metal. The use of mercuric chloride has been found to result in formation of amalgamated aluminum at a faster rate than certain other of the mercury compounds tested, permitting use of the above-indicated small amounts. The hydrous alumina obtained, moreover, with the use of the above small amounts of mercuric chloride is substantially free of chlorine.

As indicated above, the velocity of reaction of the aluminum is dependent upon the extent of exposed surface area of the aluminum and also on the amount of mercury or mercury compound present in the reaction mixture. The reaction speed is further dependent on the degree of agitation or the rate at which fresh surfaces of aluminum metal are exposed to contact with the water. It may accordingly be desirable to effect agitation of the reaction mixture forming the hydrous alumina slurry. In some instances, it may be desirable to ball mill the aluminum metal continuously or intermittently in the water containing mercury or mercury compound to thereby expose fresh surface of the aluminum metal to amalgamation and subsequent reaction to alumina.

Figure 2:
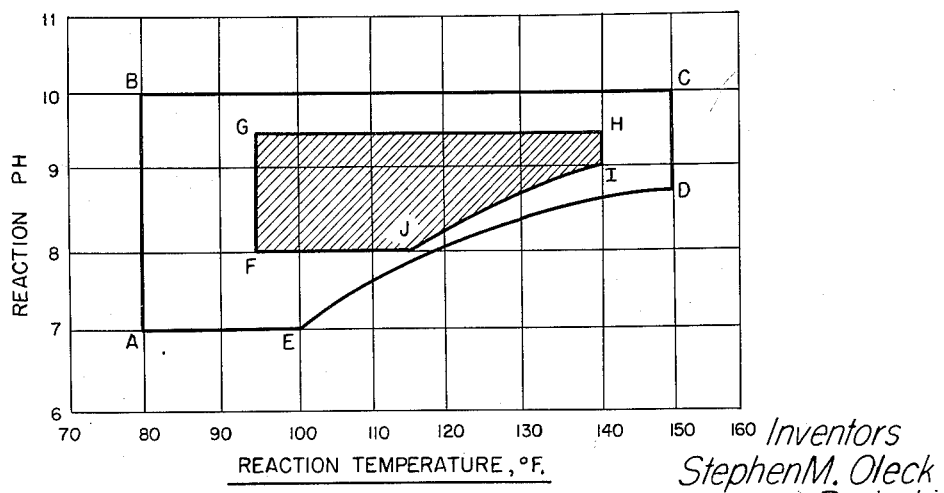

Temperature and pH of the reaction mixture are other important variables effecting the velocity and course of the reaction between aluminum and water. The temperature of the reaction mixture forming the hydrous alumina of desired phase composition should be closely controlled within the range of 80° F. to 150° F. with maintenance of the pH of the reaction mixture within the range of about 7 to about 10. It is particularly preferred to maintain the reaction temperature within the range of 95° F. to 140° F. with a pH of between about 8 and about 9.5. The pH of the reaction mixture may be adjusted by the addition of suitable compounds which do not interfere with the desired course of the reaction such as for example, aluminum chloride, ammonium hydroxide, ammonium carbonate, urea and the like. The use of volatile compound such as the ammonia-containing and ammonia-producing compounds will generally be employed when the addition of an additive material is desired. In FIGURE 2 of the accompanying drawing the pH of the reaction mixture is plotted against the reaction temperature in degrees Fahrenheit. Referring to this figure, it is preferred to control the temperature of the reaction mixture in which hydrous alumina of desired phase composition is formed at between 80° F. and 150° F. and the pH thereof between 7 and 10, said reaction temperature and pH being correlated to lie within the area ABCDE of FIGURE 2. It is particularly preferred to control the reaction temperature to within the range of 95° F. to 140° F. and the reaction pH within the range of 8 to 9.5 which reaction temperature and pH are correlated to lie within the area FGHIJ of FIGURE 2. It has been found that under the aforementioned conditions of temperature and pH that the resulting hydrous alumina of desired phase composition is obtained.

An excess of water in the liquid phase should be present in the reaction mixture for forming the hydrous alumina product. Generally, an amount of water is employed such as to afford a resulting slurry having a solids content of at least 5 percent by weight and generally between about 10 and about 20 percent by weight. The reaction between water and aluminum is desirably carried out for such period of time until the aluminum is essentially entirely converted to hydrous alumina. The reaction conditions are generally such that the aluminum metal is substantially completely converted to hydrous alumina in a reaction period of between about 8 and about 96 hours and preferably between about 8 and about 30 hours.

The hydrous alumina so obtained is impregnated or otherwise composited with platinum, generally by contacting with a solution of a platinum compound of concentration sufficient to afford a platinum content of between about .01 and about 5 percent by weight of the ultimate catalyst. Alternatively, impregnation of the alumina may be effected after filtration or otherwise concentration thereof. After impregnation, the resulting impregnated product is dried generally at a temperature within the range of 220° to 450° F. for at least 6 hours and up to 24 hours or more with a slow stream of air circulated to carry off the water vapor. The resulting composite is mixed, in the form of rough granules or after grinding to a fine powder, with a dilute aqueous solution of nitric acid containing not more than about 5 percent $HNO_3$ based on the weight of alumina. The resulting mixture is feasibly formed into particles of suitable size by pelleting or extruding. In the latter instance, the amount of water present in the nitric acid solution is such as to form a resulting mixture of extrudable consistency.

The particles so obtained are dried and thereafter subjected to a high temperature treatment or calcination at a temperature between about 650° F. and about 1000° F. for a period of between about 2 and about 36 hours. It is generally preferred that the calcining be conducted to minimize contact time of the alumina-containing product with water vapor at the high temperatures encounteerd. During the drying and calcining steps the alpha alumina monohydrate component of the hydrous alumina is converted to gamma alumina and the beta alumina trihydrate component of the hydrous alumina is converted to eta alumina. While the calcination or heat treatment is generally conducted in air it is also feasible although generally less desirable to carry out the same in other oxidizing atmospheres, a reducing atmosphere such as for example hydrogen or methane or an inert atmosphere such as nitrogen. The product of alumina consisting essentially of gamma and eta alumina impregnated with a small amount of platinum is finally cooled to yield the finished product.

Platinum is suitably combined with the hydrous alumina slurry either before or after drying in the form of chloroplatinic acid and subsequently treated with hydrogen sulfide. In addition to chloroplatinic acid other suitable platinum compounds which may be employed include solutions or suspensions of platinum cyanide, platinum sulfide, platinum hydroxide or platinum oxide. In addition to platinum other metals of the platinum family such as palladium may be combined with the alumina in a manner indicated above using for example, palladium chloride as the impregnating solution. Other metals which may suitably be combined in a similar fashion with the hydrous alumina include nickel, iron or cobalt or oxides of these metals or combinations of metals or metal oxides, for example, molybdenum oxide and cobalt oxide or molybdenum oxide and oxides of nickel or iron. The amount of metal or metal oxide composited with the alumina will depend on the particular metal involved. With metals of the platinum group the amount of metal composited with the alumina will generally be within the approximate range of 0.01 to 5 percent by weight of the final composite.

The platinum-alumina catalysts prepared in accordance with the process described herein are characterized by unusual strength retention and high catalytic activity and stability. It is contemplated that hardness of catalysts prepared using hydrous alumina obtained from other methods such as for example precipitation of an aluminum salt with ammonium hydroxide can also be controlled by the addition thereto of minor amounts of nitric acid. It is further to be noted that the addition of nitric acid is not restricted to the catalyst but may also be employed for treating an aluminum catalyst base with the acid prior to activation with the promoting component. The promoting components may also be added along with the nitric acid used for hardness improvement. The promoting component combined with the alumina includes platinum, as well as other metals of the platinum series, i.e. palladium, osmium, rhodium, ruthenium, and iridium; other metals and oxides of metals of group VIII and metals and oxides of metals of group VI of the periodic system such as chromium oxide, molybdenum oxide, and combinations of such oxides with those of various other metals, for example the combined oxides of cobalt and molybdenum.

To illustrate the process of this invention, catalysts were prepared with and without nitric acid treatment for improved hardness using alumina of various phase compositons. The alumina catalyst bases thus prepared contained alpha alumina monohydrate from 7 to 100 percent by weight. The calcined alumina from these bases ranged from primarily eta alumina for the low alpha alumina monohydrate bases to primarily gamma alumina made from the base prepared at a higher reaction temperature.

The following comparative examples will serve to illustrate the process and advantages of the invention without limiting the same.

EXAMPLE 1

Three hundred twenty seven (327) grams of super purity aluminum turnings (0.008 inch thick) were reacted with 9300 cc. $H_2O$ containing 3.08 grams of mercuric chloride at room temperature for 72 hours. One third of the resulting alumina slurry containing 7.30 percent weight $Al_2O_3$ was dried at 230° F. for 24 hours in air. This dried material having a hydrous alumina composition of 7 percent $\alpha$ $Al_2O_3 \cdot H_2O$ and the remainder $\alpha$ and $\beta$ $Al_2O_3 \cdot 3H_2O$ was ground to a particle size less than 325 mesh. This dried alumina containing no platinum, was mixed with sufficient water to extrude to particles $\frac{1}{16}''$ in diametre. The extrudate obtained was dried 24 hours at 230° F. in air and calcined 16 hours at 800° F. and 2 hours at 900° F. The resulting product had a surface area of 300 square meters per gram.

EXAMPLE 2

To 12.10 pounds of the hydrous alumina slurry prepared as in Example 1 containing 7.3 percent weight $Al_2O_3$ was added 14 cc. of $H_2PtCl_6$ solution (0.1 g. Pt/cc.) diluted to 500 cc. with water. After ½ hour of continuous agitation, 379 cc. of water saturated with $H_2S$ at 90° F. was added and the agitation continued for another ½ hour. The resulting impregnated slurry was dried at 230° F. for 24 hours in air. The dried material was ground to <325 mesh.

One-half of the dried ground material (254 grams) was mixed with a sufficient quantity of water to plasticize the powder. The mixture of powder and water was then extruded to $\frac{1}{16}$ inch diameter particles. The extruded particles were dried 24 hours at 230° F. and calcined 16 hours at 800° F. and 2 hours at 900° F. in air. The finished catalyst product had a platinum content of 0.34 percent weight, a chloride content of 0.43 percent weight and a surface area of 357 square meters per gram.

EXAMPLE 3

The remaining half of the dried ground powder prepared in Example 2 (254 grams) was mixed with 16.8 grams of 70 weight percent $HNO_3$ in 70 cc. of water. The resulting mixture was extruded to $\frac{1}{16}$ inch diameter particles. The wet particles so obtained were dried 24 hours at 230° F. and calcined 16 hours at 800° F. and 2 hours at 900° F. in air. The finished catalyst product had a platinum content of 0.34 percent weight, a chloride content of 0.24 percent weight and a surface area of 369 square meters per gram.

EXAMPLE 4

Three hundred twenty seven (327) grams of super purity aluminum turnings (0.008 in. thick) were reacted with 9300 cc. $H_2O$ containing 3.08 grams of mercuric chloride at 130° F. for 24 hours. The resulting slurry containing 7.21 percent weight $Al_2O_3$ was dried at 230° F. for 24 hours in air. The dried material had a hydrous alumina composition of 62 percent $\alpha$ $Al_2O_3 \cdot H_2O$ and remainder $\alpha$, $\beta$ and $\gamma$ $Al_2O_3 \cdot 3H_2O$, mainly $\beta$ $$Al_2O_3 \cdot 3H_2O$$ 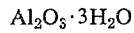

The dried alumina was ground to a particle size less than 325 mesh and mixed with sufficient water to extrude to particles $\frac{1}{16}''$ in diameter. The extrudate obtained was then dried 24 hours at 230° F. in air and calcined 16 hours at 800° F. and 2 hours at 900° F.

EXAMPLE 5

To 12.20 pounds of the hydrous alumina slurry prepared as in Example 4 containing 7.21 percent weight $Al_2O_3$ was added 14 cc. $H_2PtCl_6$ (0.1 g. Pt/cc.) diluted to 500 cc. with water. After ½ hour of continuous agitation, 379 cc. of $H_2S$ saturated water was added and the agitation continued for an additional ½ hour. The resulting impregnated slurry was dried at 230° F. for 24 hours in air. The dried material was ground to <325 mesh.

One half of the dried ground material (227.2 grams) was mixed with a sufficient quantity of water to plasticize the powder. The mixture of powder and water was then extruded to $\frac{1}{16}$ inch diameter particles. The extruded particles were dried 24 hours at 230° F. and calcined 16 hours at 800° F. and 2 hours at 900° F. in air. The finished catalyst product had a platinum content of 0.33 percent weight, a chloride content of 0.42 percent weight and a surface area of 277 square meters per gram.

EXAMPLE 6

The remaining half of the dried ground powder prepared in Example 5 (227.2 grams) was mixed with 15.7 grams of 70 weight per cent $HNO_3$ in 94 cc. of water. The resulting mixture was extruded to $\frac{1}{16}$ inch diameter particles. The wet particles so obtained were dried 24 hours at 230° F. and calcined 16 hours at 800° F. and 2 hours at 900° F. in air. The finished catalyst product had a platinum content of 0.34 percent weight, a chloride content of 0.37 percent weight and a surface area of 285 square meters per gram.

EXAMPLE 7

Three hundred twenty-seven (327) grams of super purity aluminum turnings (0.008 in. thick) were reacted with 9300 cc. containing 3.08 grams of mercuric chloride at 200° F. for 72 hours. The resulting slurry containing 7.8 percent weight $Al_2O_3$ was dried at 230° F. for 24 hours in air. This dried material had a hydrous alumina composition of 100 percent $\alpha$ $Al_2O \cdot H_2O$. The dried alumina was ground to a particle size less than 325 mesh and mixed with sufficient water to extrude to particles $\frac{1}{16}''$ in diameter. The extrudate obtained was then dried 24 hours at 230° F. in air and calcined 16 hours at 800° F. and 2 hours at 900° F.

EXAMPLE 8

To 11.28 pounds of the hydrous alumina slurry prepared as in Example 7 containing 7.8 percent weight $Al_2O_3$ was added 14 cc. $H_2PtCl_6$ (0.1 g. Pt/cc.) diluted to 500 cc. with water. After ½ hour of continuous agitation, 379 cc. of $H_2S$ saturated water was added and the agitation continued for an additional ½ hour. The resulting impregnated slurry was dried at 230° F. for 24 hours in air. The dried material was ground to <325 mesh.

One-half of the dried ground material (195.2 grams) was mixed with a sufficient quantity of water to plasticize the powder. The mixture of powder and water was then extruded, dried and calcined as in Example 5. The finished catalyst product had a platinum content of 0.34 percent weight, a chloride content of 0.45 percent weight and a surface area of 262 square meters per gram.

EXAMPLE 9

The remaining half of the dried ground powder prepared in Example 8 (195.2 grams) was mixed with 15.2 grams of 70 weight percent $HNO_3$ in 146 cc. of water. The resulting mixture was extruded, dried and calcined as in Example 6. The finished catalyst product had a platinum content of 0.34 percent weight, a chloride content of 0.23 percent weight and a surface area of 242 square meters per gram.

EXAMPLE 10

The catalyst of this example is a commercial platinum-alumina reforming catalyst containing 0.6 percent weight platinum, 0.7 percent weight chlorine and remainder eta alumina.

The catalysts of the above examples were tested for hardness and for hardness retention and the results are set forth below in Table I.

alumina base (low alpha-alumina monohydrate). Thus, the hardness of the catalyst of Example 2 which did not undergo treatment with nitric acid was 5.1 pounds force average to crush each of the 40 particles being tested, while the nitric acid treated catalyst of Example 3 required 11.1 pounds force average for each of the 40 particles. The catalyst treated with nitric acid also showed improved hardness retention after being subjected to the simulated regeneration test which consisted of four alternate cycles of oxidation with oxygen and reduction with hydrogen. The catalyst of Example 3, moreover, retained 81 percent of its original hardness compared to 62 percent retention by the catalyst of Example 2 and only 24 percent retention by the commercial catalyst of Example 10.

EXAMPLE 11

To 327 grams of super purity aluminum turnings (99.9+ weight percent aluminum) having a thickness of 0.008 inch were added 9300 cc. of solution containing 1.54 grams of mercuric chloride in water. The temperature of the reaction mixture was maintained at 100° F. The resultant aqueous slurry of alumina was screened to remove unreacted aluminum and then filtered. Two such preparations were made and combined. The filter cake analyzed 15.8 percent solids ($Al_2O_3$). A sample dried at 240° F. analyzed 45 percent alpha alumina monohydrate. The remainder consisted of a mixture of alpha and beta alumina trihydrate.

To 5885 grams of the filter cake were added while stirring, 456 cc. chloroplatinic acid solution containing 3.26 grams of platinum. Stirring was continued for 5 minutes to insure thorough blending. At the end of this time, 788 grams of $H_2S$ saturated water (at 81° F.) were blended thoroughly into the impregnated filter cake. The impregnated cake was then dried for 16 hours at 240° F. and then ball-milled for 24 hours to a size to pass through a 325 mesh sieve. The powdered product was used in preparation of the catalysts described below.

*Table I*

| Example | 1 | 2 | 3 | 4 | 5 | 6 | 7 | 8 | 9 | 10 |
|---|---|---|---|---|---|---|---|---|---|---|
| Description | | | | | | | | | | |
| Hydrous $Al_2O_3$ phase | 7% alpha $Al_2O_3 \cdot H_2O$ base | | | 62% alpha $Al_2O_3 \cdot H_2O$ base | | | 100% alpha $Al_2O_3 \cdot H_2O$ base | | | Commercial catalyst, 0.6% weight Pt |
| | Base | 0.35% weight Pt cat. | | Base | 0.35% weight Pt cat. | | Base | 0.35% weight Pt cat. | | |
| Physical properties: | | | | | | | | | | |
| Apparent dens.g./cc | 0.71 | 0.76 | 0.82 | 0.74 | 0.81 | 1.00 | 0.72 | 0.88 | 0.97 | 0.82 |
| Hardness: | | | | | | | | | | |
| Fresh catalyst: | | | | | | | | | | |
| Avg. lb/40 part.[1] | 1.8 | 5.1 | 11.1 | 17.2 | | | 9.8 | | | 10 |
| Percent harder than 26 lbs.[2] | | | | | 32.5 | 37.9 | | 42.5 | 7.5 | |
| Avg. remain. part.[3] | | | | | 17.4 | 19.9 | | 17.5 | 15.1 | |
| Treated catalyst:[4] | | | | | | | | | | |
| Avg. lb./40 part.[1] | <1 | 3.2 | 9 | 14.3 | | | 10.1 | | | |
| Percent harder than 26 lbs.[2] | | | | | 25 | 25 | | 16.9 | 2.5 | 2.43 |
| Avg. remain. part.[3] | | | | | 15.8 | 18.6 | | 17.5 | 16.8 | |
| Percent hardness retention [5] | | 62 | 81 | 84 | 83 | 80 | 100 | 70 | 70 | 24 |

[1] Hardness is measured by subjecting 40 catalyst particles (1/16" dia. x 1/8" in length) individually to a crushing force using a second class lever and determining yield force.
[2] The percent harder than 26 lbs. refers to the percentage of the 40 particles tested which do not crush under the maximum force of the apparatus, i.e. 26 lbs.
[3] Average of the remaining particles refers to the average crushing strength of the particles which crush at forces below the 26 lb. maximum.
[4] Catalyst was treated for 4 cycles of alternate oxidation with $O_2$ and reduction with $H_2$ at 950° F.
[5] Percentage of original hardness retained after contacting the catalyst with 100% steam for 5 hrs. at 1,300° F.

The advantages of nitric acid addition to alumina bases prepared at various temperatures which lead to almost 100 percent eta alumina and to 100 percent gamma alumina will be seen from the data set forth in the above Table I. The major advantage of nitric acid addition is readily evident with the catalyst prepared from the eta

EXAMPLE 12

Two hundred and fifty-eight (258) grams of the powder of Example 11 and 90 cc. of water were intimately mixed in a muller mixer. The resulting mixture was extruded to 1/16 inch diameter particles which were thereafter dried 8 hours at 240° F. and subsequently calcined to a temperature of 925° F. in air. The catalyst product obtained had a platinum content of 0.35 weight percent, a chlorine content of 0.41 weight percent and a surface area of 361 square meters per gram.

EXAMPLE 13

Two hundred and fifty-eight (258) grams of the powder of Example 11 were added to a muller mixer and mixed with a solution of 2.51 grams of concentrated nitric acid (70% $HNO_3$) in 80 cc. of water for 5 minutes. An additional 10 cc. of water were then added and the mixing continued for approximately 5 minutes. The resulting mixture was extruded to $\frac{1}{16}$ inch diameter particles which were thereafter dried 8 hours at 240° F. and subsequently calcined to a temperature of 925° F. in air. The catalyst product obtained had a platinum content of 0.34 weight percent, a chlorine content of 0.40 weight percent and a surface area of 296 square meters per gram.

EXAMPLE 14

Two hundred and fifty-eight (258) grams of the powder of Example 11 were added to a muller mixer and mixed with a solution of 5.13 grams concentrated nitric acid (70% $HNO_3$) in 80 cc. of water for 5 minutes. An additional 10 cc. of water were then added and the mixing continued for approximately 5 minutes. The resulting mixture was extruded to $\frac{1}{16}$ inch diameter particles which were thereafter dried 8 hours at 240° F. and subsequently calcined to a temperature of 925° F. in air. The catalyst product obtained had a platinum content of 0.33 weight percent, a chlorine content of 0.40 weight percent and a surface area of 300 square meters per gram.

EXAMPLE 15

Two hundred and fifty-eight (258) grams of the powder of Example 11 were added to a muller mixer and mixed with a solution of 7.78 grams of concentrated nitric acid (70% $HNO_3$) in 80 cc. of water for 5 minutes. An additional 10 cc. of water were then added and the mixing continued for approximately 5 minutes. The resulting mixture was extruded to $\frac{1}{16}$ inch diameter particles which were thereafter dried 8 hours at 240° F. and subsequently calcined to a temperature of 925° F. in air. The catalyst product obtained had a platinum content of 0.34 weight percent, a chlorine content of 0.37 weight percent and a surface area of 192 square meters per gram.

EXAMPLE 16

Two hundred and fifty-eight (258) grams of the powder of Example 11 were added to a muller mixer and mixed with a solution of 13.21 grams of concentrated nitric acid (70% $HNO_3$) in 80 cc. of water for 5 minutes. An additional 10 cc. of water were then added and the mixing continued for approximately 5 minutes. The resulting mixture was extruded to $\frac{1}{16}$ inch diameter particles which were thereafter dried 8 hours at 240° F. and subsequently calcined to a temperature of 925° F. in air. The catalyst product obtained had a platinum content of 0.35 weight percent, a chlorine content of 0.37 weight percent and a surface area of 192 square meters per gram.

EXAMPLE 17

To 327 grams of super purity aluminum (99.9+ weight percent aluminum) having a thickness of 0.008 inch were added 9300 cc. of solution containing 1.54 grams of mercuric chloride in water. The temperature of the reaction mixture was maintained at 80° F. until substantially all of the aluminum was reacted. The above preparation was repeated and the two preparations were mixed and filtered. The filter cake had a solids content ($Al_2O_3$) of 16.3 weight percent. A dried sample of the filter cake analyzed 16% alpha alumina monohydrate and the remainder consisted of a mixture of alpha and beta alumina trihydrate.

To 7345 grams of the filter cake were added while stirring, 484 cc. of chloroplatinic acid solution containing 4.165 grams of platinum. The mixture was stirred an additional 5 minutes to blend in the acid thoroughly. At the end of this time, 952 grams of $H_2S$ saturated water (at 77° F.) were blended thoroughly into the impregnated filter cake. The impregnated cake was then dried 16 hours at 240° F. and then ball milled for 24 hours to a size to pass through a 325 mesh sieve. The powdered product was used in preparation of the catalysts described below.

EXAMPLE 18

Three hundred and twenty-seven (327) grams of the powder of Example 17 were blended with 84 cc. of water in a muller mixer. The resulting mixture was extruded to $\frac{1}{16}$ inch diameter particles which were thereafter dried 8 hours at 240° F. and subsequently calcined to a temperature of 925° F. in air. The catalyst product obtained had a platinum content of 0.33 weight percent, a chlorine content of 0.40 weight percent and a surface area of 302 square meters per gram.

EXAMPLE 19

Three hundred twenty-seven (327) grams of the powder of Example 17 were blended with 75 cc. of water containing 3.21 grams of concentrated nitric acid (70% $HNO_3$) in a muller mixer. The resulting mixture was extruded to $\frac{1}{16}$ inch diameter particles which were thereafter dried 8 hours at 240° F. and subsequently calcined to a temperature of 925° F. in air. The catalyst product had a platinum content of 0.34 weight percent, a chlorine content of 0.41 weight percent and a surface area of 287 square meters per gram.

EXAMPLE 20

Three hundred twenty-seven (327) grams of the powder of Example 17 were blended with 75 cc. of water containing 6.50 grams of concentrated nitric acid (70% $HNO_3$) in a muller mixer. The resulting mixture was extruded to $\frac{1}{16}$ inch diameter particles which were thereafter dried 8 hours at 240° F. and subsequently calcined to a temperature of 925° F. in air. The catalyst product had a platinum content of 0.40 weight percent, a chlorine content of 0.44 weight percent and a surface area of 321 square meters per gram.

EXAMPLE 21

Three hundred and twenty-seven (327) grams of the powder of Example 17 were blended with 75 cc. of water containing 9.84 grams of concentrated nitric acid (70% $HNO_3$) in a muller mixer. The resulting mixture was extruded to $\frac{1}{16}$ inch diameter particles which were thereafter dried 8 hours at 240° F. and subsequently calcined to a temperature of 925° F. in air. The catalyst product had a platinum content of 0.38 weight percent, a chlorine content of 0.39 weight percent and a surface area of 327 square meters per gram.

EXAMPLE 22

Three hundred twenty-seven (327) grams of the powder of Example 17 were blended with 75 cc. of water containing 16.75 grams of concentrated nitric acid (70% $HNO_3$) in a muller mixer. The resulting mixture was extruded to $\frac{1}{16}$ inch diameter particles which were thereafter dried 8 hours at 240° F. and subsequently calcined to a temperature of 925° F. in air. The catalyst product had a platinum content of 0.33 weight percent, a chlorine content of 0.36 weight percent and a surface area of 318 square meters per gram.

The catalyst of the above examples were tested for hardness after being freshly formed and after being used in catalytic reforming. In addition, the catalysts were tested for platinum crystallite size stability. The results of such tests are set forth below in Table II.

Table II

| Ex. No. | Percent weight HNO3 Al2O3 basis | Hardness lb. force | | | | | | Percent hardness retention | Activity[1] °F. for 98 O.N. | Initial size Å | Platinum crystallite size | | | | Platinum[2] area sq. meters/gm. of catalyst |
|---|---|---|---|---|---|---|---|---|---|---|---|---|---|---|---|
| | | Fresh | | | Used | | | | | | After stability test, 20 hours at 1,300° F. in O2 | | | | |
| | | Avg. lb/40 particle | Percent harder than 26 lbs. | Avg. remain. particle | Avg. lb/40 particle | Percent harder than 26 lbs. | Avg. remain. particle | | | | Size, Å | Percent weight of crystallites | Size, Å | Percent weight of crystallites | |
| | | Catalyst from 45% alpha Al2O3·H2O Base | | | Catalyst from 45% alpha Al2O3·H2O Base | | | | | | | | | | |
| 12 | 0 | | | | 17.5 | | | 51 | 904 | 18 | 64 | 45 | 255 | 55 | 0.090 |
| 13 | 1 | 13.9 | | | | | | 61 | 907 | 21 | 60 | 45 | 425 | 55 | |
| 14 | 2 | 17.3 | | | 19.4 | | | 62 | 923 | 22 | 48 | 70 | 525 | 30 | 0.149 |
| 15 | 3 | 15.5 | | | 22.4 | | | 62 | 919 | 22 | 39 | 70 | 500 | 30 | 0.182 |
| 16 | 5 | 16 | | | 19.6 | | | | | | | | | | |
| | | Catalyst from 16% alpha Al2O3·H2O Base | | | Catalyst from 16% alpha Al2O3·H2O Base | | | | | | | | | | |
| 18 | 0 | 10.3 | | | | | | <14 | (916) | 27 | 59 | 45 | 300 | 55 | 0.093 |
| 19 | 1 | | | | | | | | 911 | | | | | | |
| 20 | 2 | | 48 | 18.9 | | 75 | 13.9 | >64 | 905 | 23 | 40 | 55 | 425 | 45 | 0.145 |
| 21 | 3 | | 46 | 19.5 | | 50 | 17.6 | >42 | 911 | 23 | 38 | 60 | 400 | 40 | 0.165 |
| 22 | 5 | | 30 | 20 | 14.4 | | | >50 | 920 | 21 | 37 | 65 | 450 | 40 | 0.181 |

[1] Mid-Continent pretreated naphtha
500 psig. 2.0 LHSV, 10/1 H2/Naphtha

[2] Platinum Area, sq. meters/gm catalyst = $0.281\%\% \text{ Pt in catalyst} \left( \sum \frac{\% \text{ of Crystallites with Diameter d}}{d(\text{Å})} \right)$ It will be seen from the foregoing table that with catalysts derived from alumina having an alpha alumina monohydrate content of 45 percent by weight, the concentration of nitric acid employed should be less than about 3 percent by weight based on alumina since amounts in excess of this quantity adversely affected the reforming activity of the resulting catalyst as denoted by the increase in temperature required to obtain a 98 octane number reformate. With catalyst derived from alumina containing 16 percent by weight alpha alumina monohydrate higher concentrations of nitric acid approaching 5 percent by weight may suitably be employed. It will further be seen from the data of the above table that the percent hardness retention as well as the platinum crystallite size stability are improved by the addition of the specified small amounts of nitric acid. The platinum crystallite size stability was determined by X-ray measurement of the crystallite sizes before and after a 20 hour treat of the catalyst with oxygen at 1300° F. and atmospheric pressure. The results of such test are indicative of growth of platinum crystallites under commercial reforming conditions. It will be seen from Table II that the size of platinum crystallites after being subjected to the stability test were considerably less for the catalyst which had undergone treatment with nitric acid as compared with the catalysts which had not been so treated. The platinum areas are indicative of the platinum surface available for carrying out the dehydrogenation-hydrogenation function of the metal. The platinum areas of the catalysts which had undergone treatment with nitric acid are more stable as compared with the catalysts which had not been so treated.

It is to be understood that the above description is merely illustrative of preferred embodiments of the invention, of which many variations may be made by those skilled in the art without departing from the spirit thereof.

We claim:

1. A method for manufacture of a platinum-alumina catalyst characterized by unusual physical strength and consisting essentially of alumina made up of gamma and eta alumina and having deposited thereon a minor proportion of platinum which comprises forming hydrous alumina having a phase composition, on a total solids basis, of about 5 to about 50 percent by weight alpha alumina monohydrate and about 50 to about 95 percent by weight of alumina trihydrate predominately in the form of beta alumina trihydrate, impregnating said hydrous alumina with a solution of a platinum compound of concentration sufficient to afford a platinum content of between about .01 and about 5 percent by weight of the ultimate catalyst, drying the resulting composite, mixing the dried composite with an aqueous nitric acid solution containing not more than about 5 percent by weight of nitric acid based on the weight of alumina, drying and calcining the resulting mixture at an elevated temperature sufficient to convert the alpha alumina monohydrate component thereof to gamma alumina and the beta alumina trihydrate component thereof to eta alumina.

2. A method for manufacture of a platinum-alumina catalyst characterized by unusual physical strength and consisting essentially of alumina made up of gamma and eta alumina and having deposited thereon a minor proportion of platinum which comprises forming hydrous alumina having a phase composition, on a total solids basis, of about 10 to about 35 percent by weight of alpha alumina monohydrate and about 65 to about 90 percent by weight of alumina trihydrate predominately in the form of beta alumina trihydrate, impregnating said hydrous alumina with a solution of a platinum compound of concentration sufficient to afford a platinum content of between about .01 and about 5 percent by weight of the ultimate catalyst, drying the resulting composite, mixing the dried composite with an aqueous nitric acid solution containing between about 1 and about 5 percent by weight of nitric acid based on the weight of alumina, forming the resulting mixture into particles and drying and calcining said particles at an elevated temperature sufficient to convert the alpha alumina monohydrate component thereof to gamma alumina and the beta alumina trihydrate component thereof to eta alumina.

3. A method for manufacture of a platinum-alumina catalyst characterized by unusual physical strength and consisting essentially of alumina made up of gamma and eta alumina and having deposited thereon a minor proportion of platinum which comprises producing hydrous alumina consisting essentially, on a total solids basis, of about 5 to about 50 percent by weight alpha alumina monohydrate and about 50 to about 95 percent by weight of alumina trihydrate, predominately in the form of beta alumina trihydrate by reacting high purity aluminum metal with excess water, in the absence of acid, and in the presence of a material selected from the group consisting of mercury and a mercury compound present in an amount corresponding to between about $.25 \times 10^{-6}$ and about $100 \times 10^{-6}$ pounds of mercury per square inch of surface of aluminum metal, controlling the temperature of the reaction mixture to within the range of 80° F. to 150° F. and the pH within the range of 7 to 10, the reaction temperature and pH being correlated to lie within the area ABCDE of FIGURE 2 of the accompanying drawing for a period of between about 8 and about 96 hours during which period substantially all of the aluminum metal is converted into hydrous alumina, impregnating said hydrous alumina with a solution of a platinum compound of concentration sufficient to afford a platinum content of between about .01 and about 5 percent by weight of the ultimate catalyst, drying the resulting composite, mixing the dried composite with an aqueous nitric acid solution containing not more than about 5 percent by weight of nitric acid based on the weight of alumina, drying and calcining the resulting mixture at an elevated temperature sufficient to convert the alpha alumina monohydrate component thereof to gamma alumina and the beta alumina trihydrate component thereof to eta alumina.

4. A method for manufacture of a platinum-alumina catalyst characterized by an unusual physical strength and consisting essentially of alumina made up of gamma and eta alumina and having deposited thereon a minor proportion of platinum which comprises producing hydrous alumina consisting essentially, on a total solids basis, of about 10 to about 35 percent by weight alpha alumina monohydrate and about 65 to about 90 percent by weight of alumina trihydrate, predominately in the form of beta alumina trihydrate by reacting high purity aluminum metal with excess water, in the absence of acid, and in the presence of a material selected from the group consisting of mercury and a mercury compound present in an amount corresponding to between about $.25 \times 10^{-6}$ and about $10 \times 10^{-6}$ pounds of mercury per square inch of surface of aluminum metal, controlling the temperature of the reaction mixture to within the range of 95° F. to 140° F. and the pH within the range of 8 to 9.5, the reaction temperature and pH being correlated to lie within the area FGHIJ of FIGURE 2 of the accompanying drawing for a period of between about 8 and about 96 hours during which period substantially all of the aluminum metal is converted to hydrous alumina, impregnating said hydrous alumina with a solution of a platinum compound of concentration sufficient to afford a platinum content of between about .01 and about 5 percent by weight of the ultimate catalyst, drying the resulting composite, mixing the dried composite with an aqueous nitric acid solution containing between about 1 and about 5 percent by weight of nitric acid based on the weight of alumina, forming the resulting mixture into particles and drying and calcining said particles at an elevated temperature sufficient to convert the alpha alumina monohydrate component thereof to gamma alumina and the beta alumina trihydrate component thereof to eta alumina.

5. A method for manufacture of a platinum-alumina catalyst characterized by unusual physical strength and consisting essentially of alumina made up of gamma and eta alumina and having deposited thereon a minor proportion of platinum which comprises producing hydrous alumina consisting essentially, on a total solids basis, of about 5 to about 50 percent by weight alpha alumina monohydrate and about 50 to about 95 percent by weight of alumina trihydrate, predominately in the form of beta alumina trihydrate by reacting high purity aluminum metal with excess water, in the absence of acid, and in the presence of a material selected from the group consisting of mercury and a mercury compound present in an amount corresponding to between about $.25 \times 10^{-6}$ and about $100 \times 10^{-6}$ pounds of mercury per square inch of surface of aluminum metal, controlling the temperature of the reaction mixture to within the range of 80° F. to 150° F. and the pH within the range of 7 to 10, the reaction temperature and pH being correlated to lie within the area ABCDE of FIGURE 2 of the accompanying drawing for a period of between about 8 and about 96 hours during which period substantially all of the aluminum metal is converted into hydrous alumina, impregnating said hydrous alumina with a solution of chloroplatinic acid of concentration sufficient to afford a platinum content of between about .01 and about 5 percent by weight of the ultimate catalyst, drying the resulting composite, mixing the dried composite with an aqueous nitric acid solution containing not more than about 5 percent by weight of nitric acid based on the weight of alumina, drying and calcining the resulting mixture at an elevated temperature sufficient to convert the alpha alumina monohydrate component thereof to gamma alumina and the beta alumina trihydrate component thereof to eta alumina.

References Cited in the file of this patent
UNITED STATES PATENTS

| 2,809,170 | Cornelius | Oct. 8, 1957 |
| 2,835,638 | Black et al. | May 20, 1958 |
| 2,898,387 | Teter | Aug. 4, 1959 |
| 2,911,375 | Coley et al. | Nov. 3, 1959 |
| 2,973,330 | Hinlicky et al. | Feb. 28, 1961 |
| 2,840,532 | Haensel | June 24, 1958 |

UNITED STATES PATENT OFFICE
CERTIFICATE OF CORRECTION

Patent No. 3,025,248                       March 13, 1962

Stephen M. Oleck et al.

It is hereby certified that error appears in the above numbered patent requiring correction and that the said Letters Patent should read as corrected below.

Column 2, line 47, for "trihydrade" read -- trihydrate --; column 4, line 72, after "of" insert -- the --; column 7, line 13, for "aluminum" read -- alumina --; columns 9 and 10, Table I, column 7, line 3 thereof, for "37.9" read -- 37.6 --; columns 13 and 14, Table II, footnote 2 thereof, for "0.281%%" read -- 0.281 x % --.

Signed and sealed this 24th day of July 1962.

(SEAL)
Attest:

ERNEST W. SWIDER
Attesting Officer

DAVID L. LADD
Commissioner of Patents